(No Model.) 2 Sheets—Sheet 1.

R. G. GUPTILL.
ROTARY SYSTEM OF STAGE SCENERY.

No. 355,075. Patented Dec. 28, 1886.

WITNESSES: INVENTOR:
R. G. Guptill
BY Munn & Co.
ATTORNEYS.

(No Model.) 2 Sheets—Sheet 2.
R. G. GUPTILL.
ROTARY SYSTEM OF STAGE SCENERY.
No. 355,075. Patented Dec. 28, 1886.
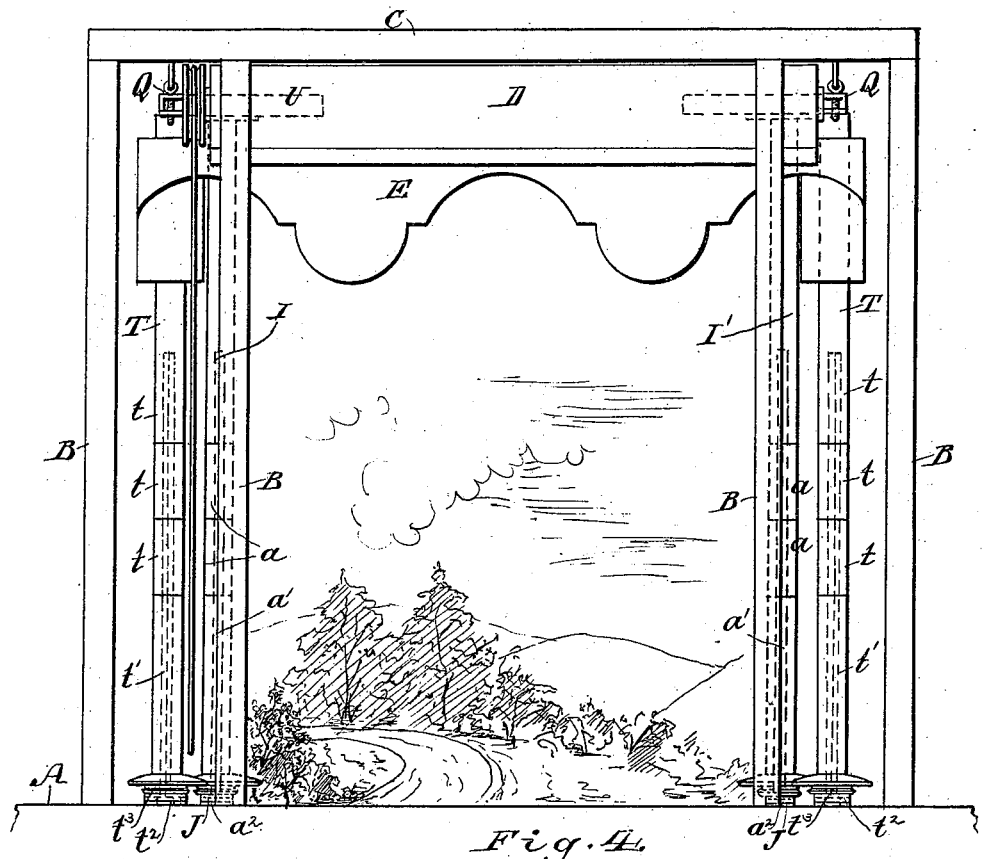
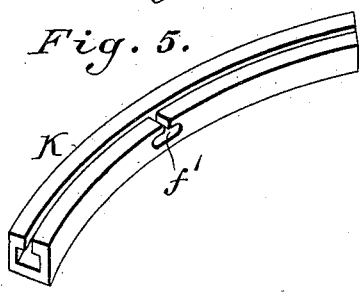
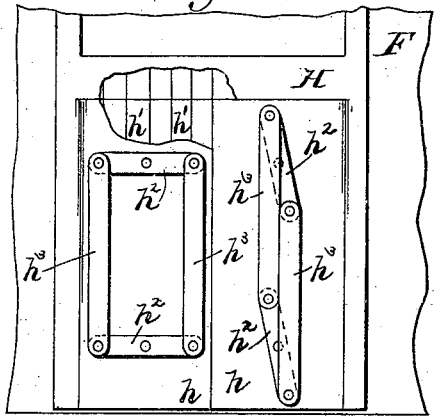
WITNESSES:
INVENTOR:
BY
ATTORNEYS.

UNITED STATES PATENT OFFICE.

RODERICK G. GUPTILL, OF CHICAGO, ILLINOIS.

ROTARY SYSTEM OF STAGE SCENERY.

SPECIFICATION forming part of Letters Patent No. 355,075, dated December 28, 1886.

Application filed March 9, 1886. Serial No. 194,568. (No model.)

*To all whom it may concern:*

Be it known that I, RODERICK G. GUPTILL, of Chicago, in the county of Cook and State of Illinois, have invented a new and Improved Rotary System for Stage Scenery, of which the following is a full, clear, and exact description.

The rotary system has for its object the simplification of all stage paraphernalia, so as to render it practicable for traveling companies to present their plays with the same attention to detail they are accustomed to in the metropolis, and without incurring the enormous expense of transporting through the country the cumbersome scenery used on the stage at the present day.

The chief advantages of the rotary system are, that it is adjustable to all stages; entirely under the control of one competent mechanic; entire changes of scenes can be made in from one to three minutes; that every interior can be boxed and all exteriors given the circular form with concave canopy at any height desired; that the entire scenery for five changes of portable scenery will not exceed in weight one thousand pounds; that scenery carried on this system will retain its freshness as long as stationary scenery under the present order; that it is convenient for transportation; the entire scenery of any stage could be placed upon one wagon; all set pieces—such as statuary, trees, houses, water—made in practical and durable shape, weighing but little more than the painted canvas; that it can be placed in working order inside of three hours' time by one stage-carpenter without the use of hammer, saw, screw-driver, or wrench. In fact, the system was designed to produce grander effects, reduce the expenditures, and increase the durability of all stage paraphernalia.

The invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1:
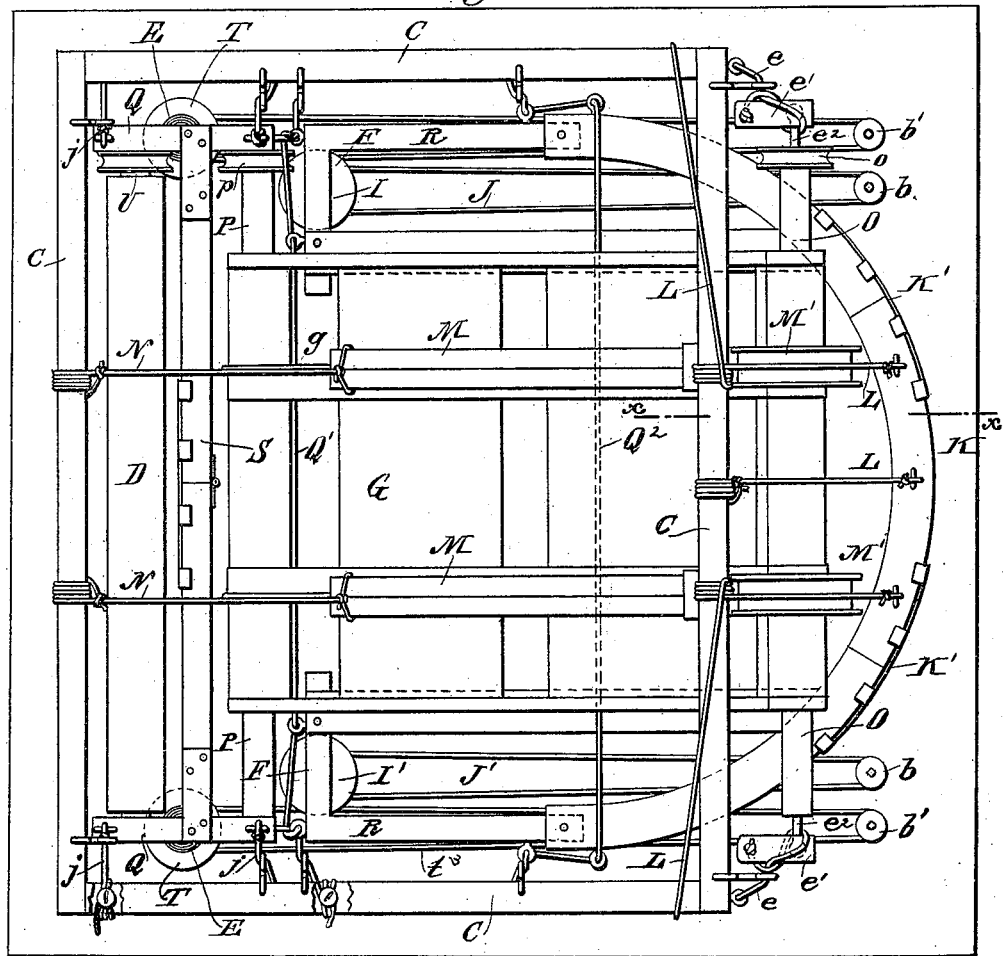
Figures 2, 7:
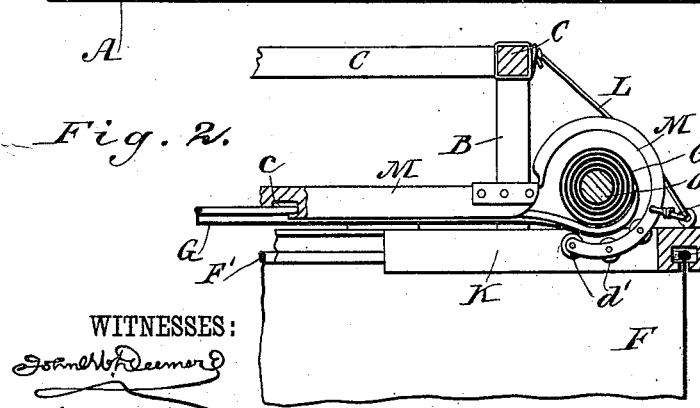

Figure 1 is a plan view of a stage and my new scenery. Fig. 2 is a detailed sectional elevation taken on the line $x\ x$ of Fig. 1. Fig. 3 is a front elevation of the stage and scenery. Fig. 4 is a detailed front elevation of a part of a scene, showing doors formed therein. Fig. 5 is a detailed perspective view of one of the grooved supports for the scenery. Fig. 6 is a detailed sectional view of the canopy, and Fig. 7 is a detail view showing the clamp.

A represents the stage.

B B represent fixed uprights rising from the stage, and C C represent horizontal cross-pieces secured to the upper ends of the uprights B. D, Fig. 1, represents the drop-curtain; E, the fly at the front of the stage just back of the curtain D.

F represents the scenery, and G, Fig. 2, represents the canopy or overhead scene. The scene F is made of cotton or burlap in any form desired, and stitched to one or more ropes, F', the thread going directly through the center of the rope and one or more thicknesses of the cloth, thus causing all the wear to come on the rope instead of on the cloth.

The doors H H are made of profile-cloth $h\ h$, mounted on thin strips, $h'\ h'$, of wood glued between two pieces of cloth, the same being by preference cut on the bias, so as to stretch slightly at the back of each door, which is necessary to permit the doors to be rolled upon a cylinder with the rest of the scene, as hereinafter described. Pivoted to each door are the two cross-pieces $h^2\ h^2$, and pivoted to the ends of these cross-pieces are the two upright pieces $h^3\ h^3$, which, together with the cross-pieces $h^2$, form a hinged frame, which may be opened, as shown at the left in Fig. 4, for holding the door in a flat state, or folded, as shown at the right in said figure, to permit the doors to be rolled.

All windows in the scenery will be made on the same plan as the doors just described; and all statuary, pictures, fire-places, &c., may be made of profile-cloth and secured to the scene.

There will be as many scenes F as the setting of the play requires, and these will be secured together at their side edges by buttons and clasps, or by any suitable means, and the whole rolled upon a roller, I, and when set will be passed from the roller I around the stage A to the roller I', (see Figs. 1 and 3,) and attached to said latter roller by any suitable means. The rollers I I' are set in vertical position on the stage, and held in such position by suitable bearings at the bottom and suitable stays at the top, and the rollers are made up of sections $a\,a$, hollow or solid, placed upon a rod, $a'$, so that by removing or adding sections the length of the rollers may be increased or diminished to suit any stage. At their lower ends the rollers I I' are provided with pulleys $a^2\,a^2$, around which the belts J J' pass. These belts also pass around the pulleys $b\,b$, Fig. 1, in practice held upon blocks secured to the stage, and the axes of the pulleys $b\,b$ are made square, to receive a crank or key for revolving the pulleys $b$, for turning the rollers I I' to shift the scenery F—that is, to pay it off from the roller I and wind it upon the roller I', or vice versa. The scene F between the rollers I I' is held in upright position by the curved bar K, which is channeled or formed with the T-groove $f$, to receive and hold the rope F', secured to the upper edge of the scene, as shown clearly in Fig. 2.

The bar K may be of any desired shape, and an opening, $f'$, may be formed in it, as shown in Fig. 5, to permit the attachment of an extension and to permit the scene to be drawn into and through the same. The bar K is held in place above the stage the height of the scene F by being attached by rods or ropes L L, or other suitable attachments or stays, to the upper fixed bars, C C, as shown in Fig. 1, and many grooved bars K, or bars of similar shape, may be used, according to the scenes required in the play, and they may be variously arranged.

The canopy G is formed with several ribbed flaps, G', at its upper surface, as shown in Fig. 6, the ribs $g$ of which are for holding the canopy in the grooves or channels $c$ of the bars M M, which are held above the stage at their front ends by the ropes or stays N N, attached to the front cross-bar, C. At their rear ends the bars M M are provided with the loops or rings M' M', which reach over the roller O, as shown in Figs. 1 and 2, on which the rear end of the canopy G is wound, and the rings M' are stayed to the bar K by the short stay-ropes $d$, as shown in Fig. 2; and in order to facilitate the rolling of the canopy upon the roller O, I provide the lower portion of the rings M' with the anti-friction rollers $d'\,d'$, as shown in Fig. 2. The canopy G is held at its forward end upon the roller P, (shown in Fig. 1,) and at its rear end upon the above-mentioned roller O, so that by turning these rollers the canopy may be shifted by winding it from one roller to the other.

The rollers O P are provided with pulleys $o\,p$, respectively, over which belts or ropes may be passed for turning the rollers. The roller O is held in place above the stage by the stays $e\,e$, attached to the cross-bars C C, and the stay-blocks $e'\,e'$, to which the stays $e$ are attached, and which form bearings or ball-and-socket joints with the gudgeons $e^2\,e^2$ of the rollers, as shown in Fig. 1. The roller P is held above the stage in the two metal braces Q Q, in which it is journaled, the braces Q Q being secured to the fixed bars C C by the stays $j\,j$. The rear ends of the braces Q Q are kept from lateral movement by the cross-line Q', to which the braces are attached, and which reaches across the stage and is secured to the bars C C, as shown in Fig. 1. The upper ends of the rollers I I' and the ends of the channel-bar K are held in place by the angle-braces R R, held in place at their forward ends by the said cross rope or line Q', and at their rear ends by the cross-line $Q^2$, attached at its ends to the fixed bars C C. The braces Q R and channel-bar K may be quickly and easily put up and taken down, which greatly facilitates the labor of setting and the removal of the scenery.

The braces Q are held the proper distance apart by the cross-bar S, which spans the stage and is jointed in the center, so it may be folded into small compass when the scenery is to be transported.

In the braces Q Q are journaled the upper ends of the vertical rollers T T, and also the ends of the horizontal rollers U, on which latter is wound the drop-curtain D, above mentioned. The rollers T T are journaled at their lower ends in suitable bearings in the stage, and are made in sections $t\,t$, placed upon a square rod, $t'$, so the length of the rollers may be adjusted, and upon them is wound the fly E, above referred to, so that by turning the rollers T the fly may be wound from one to the other, for shifting it to suit the change of scene F.

For revolving the rollers T they are provided with pulleys $t^2$ at their lower ends, around which the belts $t^3$ pass, and these belts pass to the back of the stage and pass around the pulleys $b'$ on the above-mentioned blocks B', and these pulleys $b'$, like the pulleys $b$, have square axes to receive a key or wrench for revolving the pulleys for turning the rollers T T.

The channel-bar K is made in sections, which may be separated for convenience in transportation, and when put together the sections are connected together end to end by the metal clamp K' K', composed of two folded strips of sheet metal connected together by hinged cross-pieces $y'$, and locked together by the eccentric-clasp Y, as shown in Fig. 7.

When my new scenery is put up for use, it may be shifted by simply turning the pulley $b\,b'$, and the canopy may be shifted by turning rollers O and P, so the scenes may be changed very easily and rapidly, and when the scenery is taken down it may all be rolled upon the rollers that support it, and the bars and braces being made in sections, the whole may be packed in small compass and easily transported. Besides, the scenery may be made very light.

Having thus described my invention, what I claim as new, and desire to secure by Letters Patent, is—

1. The bar K, having a channel formed in it, and the scene F, held in the channel, in combination with opposite rollers, on which the scene is wound, substantially as and for the purposes described.

2. The combination, with the rollers O P, on which the canopy G is wound, of the bars M, formed with channels to receive and hold the cords g of the canopy.

3. The combination, with the rollers I I', channel-bar K, and scene F, of the pulleys b and belts J J', for revolving the rollers, substantially as and for the purposes set forth.

4. The combination, with stage scenery, of sectional rollers, on which the scene is wound, the sections being adapted to be separated for changing the length of the rollers, substantially as and for the purposes set forth.

5. The bars M, formed with channels and provided with the rings M', one arranged at each end, substantially as and for the purposes set forth.

6. The bar K, formed with a T-channel in its under surface and made in detachable sections, substantially as and for the purposes set forth.

7. The roller O, provided at its ends with gudgeons $e^2$, in combination with the stay-blocks $e'$, in which the gudgeons are journaled, and the stays $e$, for attaching the stay-blocks to a fixed part of the stage, substantially as described.

8. The doors H of the scene F, formed of slats $h'$, and a flexible covering therefor, in combination with a pivoted frame at the back of the door to hold it in a flat state, substantially as described.

RODERICK G. GUPTILL.

Witnesses:
HARRY A. SMITH,
FRANK C. MOYNIHAN.